May 6, 1952            G. W. LUDWICK            2,595,965
AQUARIUM DRAINAGE DEVICE
Filed Jan. 26, 1950            2 SHEETS—SHEET 1
INVENTOR
George W. Ludwick.
BY
ATTORNEYS.

May 6, 1952      G. W. LUDWICK      2,595,965
AQUARIUM DRAINAGE DEVICE
Filed Jan. 26, 1950      2 SHEETS—SHEET 2
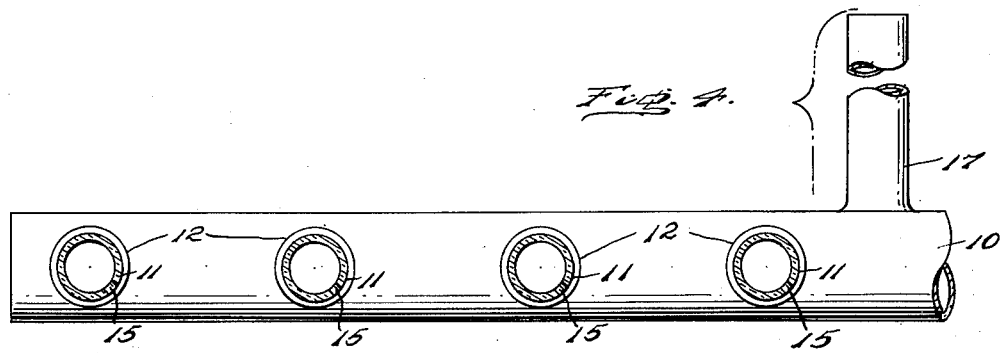
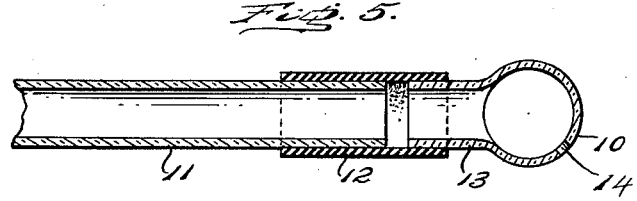
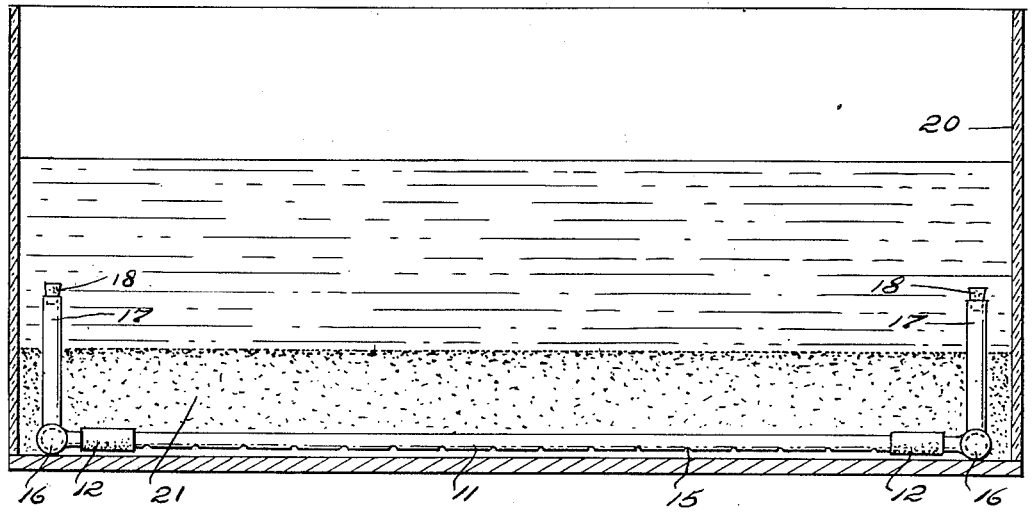
INVENTOR
George W. Ludwick.
BY Barr, Borden & Fox
ATTORNEYS.

Patented May 6, 1952

2,595,965

UNITED STATES PATENT OFFICE 2,595,965

AQUARIUM DRAINAGE DEVICE

George W. Ludwick, Camden, N. J., assignor of one-half to Joseph H. Ludwick, Camden, N. J.

Application January 26, 1950, Serial No. 140,605

5 Claims. (Cl. 119—5)

The present invention relates to aquariums and more particularly to an apparatus and method for maintaining the same in a sanitary condition.

In aquariums as now constructed and used, it is necessary to periodically remove the fish, water, and sand from the aquarium, clean the sand, replace it, supply fresh water and return the fish. Since it normally requires about a week for the sand and water to become vitiated with stagnant material and obnoxious gases (which latter tend to acidify the water) this constant intermittent cleaning becomes a laborious burden.

Some of the objects of the present invention are to provide a novel apparatus for maintaining an aquarium in a sanitary condition; to provide a novel method for maintaining an aquarium in a sanitary condition; to provide means for removing stagnate material from the sand in an aquarium; to provide means for collecting and segregating stagnation impregnated water in an aquarium; to provide an apparatus wherein provision is made for removing collected and segregated stagnation impregnated water from an aquarium; to provide a method wherein collected deleterious gases and material are drawn off and replaced by another collection of such gases and material; to provide an aquarium-cleaning process wherein the sand is automatically maintained in a clean sanitary condition and the water in an operative state of alkalinity; to provide an apparatus and method for use with aquariums whereby cleaning periods become months instead of days or weeks as heretofore and during operation only added water is necessary; to provide a method wherein water from the aquarium is filtered of sand, collected in separated condition below the bed of sand in the aquarium, drawn off periodically, while drawing water from the aquarium through the bed of sand to absorb stagnant material and collecting this water in place of that drawn off; and to provide other improvements as will hereinafter appear.

In the accompanying drawings, Fig. 1 represents a plan of an apparatus embodying one form of the present invention; Fig. 2 represents a bottom plan of the same; Fig. 3 represents an end elevation of the same; Fig. 4 represents a section on line 4—4 of Fig. 2; Fig. 5 represents a sectional detail showing the jointing of the parts; and Fig. 6 represents a sectional elevation of an aquarium showing the apparatus of the invention in operative position.

Referring to the drawings, one form of the present invention comprises a framework formed by opposite disposed glass tubular headers 10 interconnected by a plurality of laterally spaced glass tubes 11 lying in the same transverse plane and communicating respectively at opposite ends with the respective headers 10. Preferably, the tubes 11 are each arranged to be connected at each end to the headers 10 by means of rubber nipples 12, which fit respectively over tubular bosses 13 and therefore can be readily removed for cleaning or replaced if broken, but also allow the framework to be shipped in knock-down condition. Since the framework in operating position seats upon the bottom of an aquarium and is concealed by a bed of sand, provision is made for the water in the aquarium to enter and fill the headers 10 and tubes 11, by providing a row of inlets 14 in the bottom of each header 10 and a like row of inlets 15 in the bottom of each tube 11. All of these inlets 14 and 15 are relatively small, for example, of the order of one sixty-fourth of an inch, so that particles of sand can be prevented from entering the headers and tubes. The rows of inlets 14 and 15 are offset from the line of contact of the headers and tubes with the bottom of the aquarium to ensure free entrance of the water while filtering out the sand, thus leaving the contaminated water free of sand and ready for syphoning off.

Preferably the two headers 10 are open at the ends to receive closures in the form of removable corks 16, which normally stay in place but can be taken out to permit the insertion of a suitable cleaning brush or the like. Also, the diameter of these headers 10 is preferably larger than the diameter of any tube 11 so that free circulation of the water is ensured.

For the purpose of drawing off collected stagnated water from the framework, each header 10 is provided with an upstanding discharge pipe 17 of a length such that its top open end protrudes above the bed of sand at a convenient location for the attachment of a hose for syphoning the aforesaid stagnant water out of the framework. Normally these open end pipes 17 are closed by corks 18 and are removed only to evacuate the framework, though only one pipe will be used at a time, and the second one serving for a reverse evacuation in case that end of the framework becomes clogged.

In operation, the framework is placed in an aquarium and rests upon the bottom thereof to be covered by a bed of sand 21 having a depth such that the ends of the pipes 17 are readily accessible. After the sand is in place, water 22 is poured in to the required level for fish life. The entering water seeps downward through the sand to enter the inlets 14 and 15 free of sand and thus fills the headers and tubes. The aquarium is now ready for use and needs no attention until such lapse of time takes place as would mean there was a heavy collection of stagnate impregnated water. At that time a cork 18 is removed from its pipe 17, a hose attached and the liquid contents of the framework syphoned off. The amount withdrawn depends upon the size of the aquarium, but for most aquariums in general home use, the syphoning off of one quart suffices. The evacuation of the framework draws the water 22 downward through the sand 21, absorbing and carrying off with it collected stagnant residue in the sand and circulating it into the framework. Thus, the sand is maintained clean, free of stagnant material, and decomposition gases, making it fertile for plant life while the water is clear and sanitary for the fish. Again a period of time is allowed to elapse when the syphoning step is repeated and the collected stagnant impregnated water drawn off, and, of course, a like quantity of water is poured into the aquarium as a replacement, and the cycle of operations continues.

While the framework shown and described is rectangular, it is to be understood that its shape and size can be varied to suit different aquariums without departing from the invention. Also, the invention is not limited to a glass framework, but may be made of any material which will have no deleterious effect upon fish or plants.

In the foregoing description the word "sand" is used in the sense of aquarium sand which is actually fine gravel and not sand in the usual sense. This definition is to be followed in considering the claims.

Having thus described my invention, I claim:
1. The combination of an aquarium containing water and a bed of aquarium sand, a tubular closed end member buried in said sand adjacent the bottom of said aquarium and having a plurality of downwardly opening water inlets, said member being wholly confined within said aquarium and removable as a unit, and an upwardly disposed discharge pipe leading from said tubular member for periodically drawing off stagnant water and contaminated matter from said aquarium.

2. An apparatus according to claim 1 characterized by having the ends of the tubular member provided with removable closures whereby the framework can be cleaned when necessary.

3. An apparatus for assembly in an aquarium comprising a removable tubular unit to substantially form a floor of an aquarium beneath the bed of sand therein, said unit having water inlets in the lower face thereof arranged in close proximity over the entire area of the unit, and a discharge pipe attached to and removable with said unit, whereby a complete unitary apparatus is provided for placing in and removing from an aquarium.

4. The combination of an aquarium containing water and a bed of aquarium sand, a tubular member buried in said sand and seated on the bottom of said aquarium and having a plurality of downwardly opening water inlets below the bottom of said sand bed, said member being wholly confined within said aquarium and removable as a unit, and an upwardly disposed pipe leading from said tubular member to discharge above the sand bed for periodically drawing off stagnant water and contaminated matter from said aquarium.

5. The combination of an aquarium containing water and a bed of aquarium sand, a frame member buried in said sand and having holes opening into the sand below said member, and means adapted for connection to a suction means for evacuating collected material from the sand below said member by utilizing said member holes.

GEORGE W. LUDWICK.

REFERENCES CITED

The following references are of record in the file of this patent:

UNITED STATES PATENTS

| Number | Name | Date |
| --- | --- | --- |
| 460,809 | Gunther | Oct. 6, 1891 |
| 649,494 | Sues | May 15, 1900 |
| 653,160 | Williamson | July 3, 1900 |
| 1,616,125 | Holman | Feb. 1, 1927 |
| 2,491,853 | Feldman | Dec. 20, 1949 |